RECORDING AND DISPLAY METHOD AND APPARATUS

Original Filed Feb. 12, 1971

4 Sheets-Sheet 1

INVENTORS: D. MAYDAN
M. I. COHEN
R. E. KERWIN
BY Francis E Marie
ATTORNEY

RECORDING AND DISPLAY METHOD AND APPARATUS

Original Filed Feb. 12. 1971 4 Sheets-Sheet 2

RECORDING AND DISPLAY METHOD AND APPARATUS

Original Filed Feb. 12. 1971 4 Sheets-Sheet 3

RECORDING AND DISPLAY METHOD AND APPARATUS

Original Filed Feb. 12, 1971 4 Sheets-Sheet 4

United States Patent

Re. 28,375

Reissued Mar. 25, 1975

28,375

RECORDING AND DISPLAY METHOD AND APPARATUS

Dan Maydan, Short Hills, Melvin Irwin Cohen, Berkeley Heights, and Robert Eugene Kerwin, Westfield, N.J., assignors to Bell Telephone Laboratories, Incorporated, Murray Hill, N.J.

Original No. 3,720,784, dated Mar. 13, 1973, Ser. No. 115,029, Feb. 12, 1971. Application for reissue Jan. 23, 1974, Ser. No. 435,821

Int. Cl. G11b *7/00, 11/02*

U.S. Cl. 178—6.6 R 27 Claims

Matter enclosed in heavy brackets [ ] appears in the original patent but forms no part of this reissue specification; matter printed in italics indicates the additions made by reissue.

ABSTRACT OF THE DISCLOSURE

An image comprising a multitude of small discrete holes is formed by a laser in a radiation absorbing film. Appropriate means form a large number of brief-duration, amplitude-modulated pulses of optical radiation. These pulses are then deflected and focused to form an array of discrete holes in a film, such as a 500 Angstrom thick layer of bismuth, on a polyester substrate. By varying the energy in each pulse, the size of the holes can be varied to form images having a gray scale.

BACKGROUND OF THE INVENTION

This invention relates to a recording and display system and in particular to one in which pictorial images are recorded by forming with a laser small discrete holes in a radiation absorbing film. The phrase "pictorial image" refers to an image that by its likeness suggests another thing. Such an image might be a picture of a three-dimensional object, a photograph, or a representation of a chart, a page of writing or a page of type. All these images are alike in that they suggest what they represent. In each case, this suggestion is effected by two-dimensional spatial relationships among the elements of the image that create a representation that looks like the object recorded in the image. Because the spatial relationships extend over two dimensions, these images may also be referred to as two-dimensional pictorial images. By way of contrast, the phrases "pictorial image" and "two-dimensional pictorial image" do not refer to binary records in which digital data are stored in the form of the presence or absence of holes at an array of points in a recording medium. Such a record of an array of bits does not look like the object it represents; and the only meaningful spatial relationship between the bits is a linear or one-dimensional order.

It has been recognized that the high power densities available from laser beams makes them suitable for various welding and cutting operations on a wide variety of materials. One application proposed by Akin in U.S. Pat. No. 3,181,170 is the use of a laser to evaporate portions of a metallic film that has been deposited on a glass substrate. By turning the laser on and off as the laser beam is scanned across the film, graphic or alphanumeric information can be recorded on this film. Various modifications of this system were developed by Becker in U.S. Pat. No. 3,314,073, who teaches the use of diffraction limited optics to increase the density of information recorded on a suitable vaporizable coating, *by Robert Bosch GmbH in German Auslegeschrift 1,263,091, which describes amplitude modulating a continuous wave laser to store video information on videotape,* and by Carlson et al. in U.S. Pats. No. 3,448,458 and No. 3,465,352, who teach various modifications of the system particularly suitable for scanning the laser beam and viewing pictorial images recorded on the film. As described by Carlson et al. in U.S. Pat. No. 3,448,458, typical apparatus uses a continuous wave (CW) laser to cut a set of lines in the recording medium by vaporizing the medium. This set of lines comprises a pictorial image of, for example, alpha-numeric characters.

*The Robert Bosch GmbH patent describes an apparatus that writes, by a similar mechanism, patterns that are later read bit by bit in a scanning mode, it being evident that the frames are too small to be viewed optically.*

Despite these developments, the system that has evolved for recording information is extremely inefficient, it does not provide a gray scale, and its performance is hampered by its power requirements. In order to obtain from a conventional gas laser the threshold energy per unit area required to affect the recording medium enough to produce a record, it has been necessary to record only very small images using very narrow laser beams with just enough energy to affect the recording medium. Typical reduction ratios as reported by Carlson et al. in U.S. Pat. No. 3,465,352 are greater than 100 to 1. Consequently, the size of the images has frequently been too small for conventional enlargement to full size using standard projection arrangements. And because the depth of focus of the laser beam depends on the square of the beam diameter, very stringent requirements are imposed on the stability of the position of the recording medium. In addition, the images that have been produced are typically poor in quality, being essentially devoid of any gray scale. Furthermore, in some cases the quality of the image is also marred by debris left over from the image forming process and in other cases by damage done to the substrate on which the recording medium is located.

SUMMARY OF THE INVENTION

Accordingly, it is an object of this invention to use a laser to record pictorial images on a thin radiation absorbing film.

It is a further object of this invention to record pictorial images with full gray scale.

It is still another object of this invention to increase the efficiency with which such images are recorded by a laser.

These and other objects of the invention are obtained by using apparatus capable of forming a large number of short duration, amplitude-modulated pulses of spatially coherent radiation per second to create positive or negative pictorial images consisting of small discrete holes in a thin radiation absorbing film. Typically, the short laser pulses evaporate a small amount of the film at the center of the spot upon which the beam is incident and melt a large area around this region. Surface tension then draws the melted material toward the rim of the melted area, thereby displacing the film from a nearly circular region of the transparent substrate.

The incident laser power is mostly absorbed by the film, and most of the resulting heat energy is eventually conducted to the transparent substrate. By using very short laser pulses, the temperature of the spot upon which the laser beam is incident can be raised to a much higher value than would be the case if a CW laser of the same average power were used. Or, conversely, a CW laser of much higher average power would be needed to displace an equal area of the film per unit time.

By varying the amplitude of the very short laser pulses, the diameter of the region that is melted can be varied, and the area of the resulting hole increases monotonically with increasing pulse amplitude. In this way it is possible to achieve a wide range of shades of gray.

Using a pulse repetition rate of approximately one million pulses per second, high quality images have been written in raster fashion on a thin bismuth film in a period of about four seconds, of which time about 30 percent is dead time. The raster consists of 2000 lines with about 1400 sites on each line where a hole may or may not be written. The size of the image produced in this manner is such that conventional optics can be used to project it onto a relatively large screen.

A particular use for the invention is the provision of a stored display for images that are transmitted over telephone or PICTUREPHONE lines. Such an application includes, for example, the sending of copies of documents from one individual to another during the course of a phone conversation and facsimile type operations such as the transmission of an image to a remote location and the retrieval of information from a remote storage location by a user. The invention may also be used as a computer graphics terminal. Other applications will be discussed below.

An important feature of this invention is the fact that the recorded image can be substantially permanent and of archival quality.

BRIEF DESCRIPTION OF THE DRAWING

These and other objects and features of the invention will become more readily apparent from the following detailed description of the invention taken in conjunction with the following drawing in which.

DETAILED DESCRIPTION OF THE DRAWING

Figure 1:
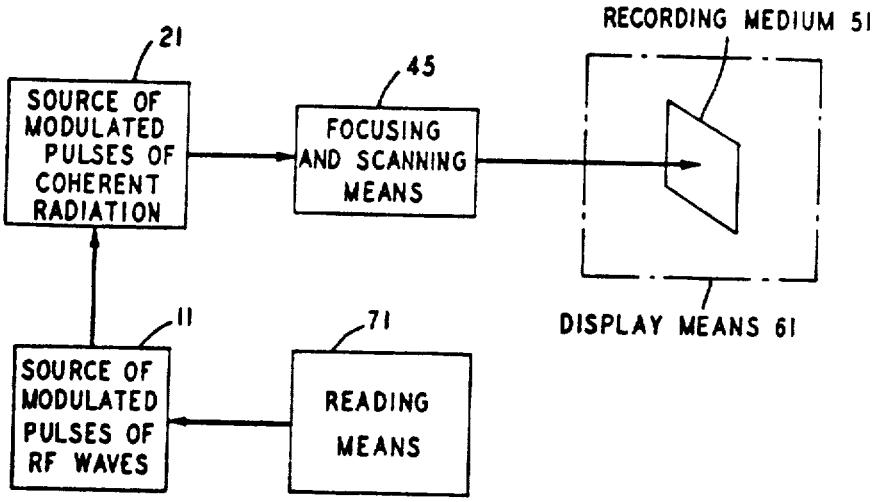
FIG. 1 depicts in block form illustrative apparatus used to practice the invention.

An illustrative embodiment of the invention is schematically represented in FIG. 1. This embodiment comprises a source 11 of amplitude-modulated pulses of radio-frequency waves, a source 21 of amplitude-modulated optical pulses of spatially coherent radiation, focusing and scanning means 45 for writing on a recording medium 51 with these optical pulses, and display means 61 for viewing what is written on medium 51. Also shown in FIG. 1 is reading means 71 that will be discussed below in conjunction with FIGS. 6 and 7.

Figure 2:
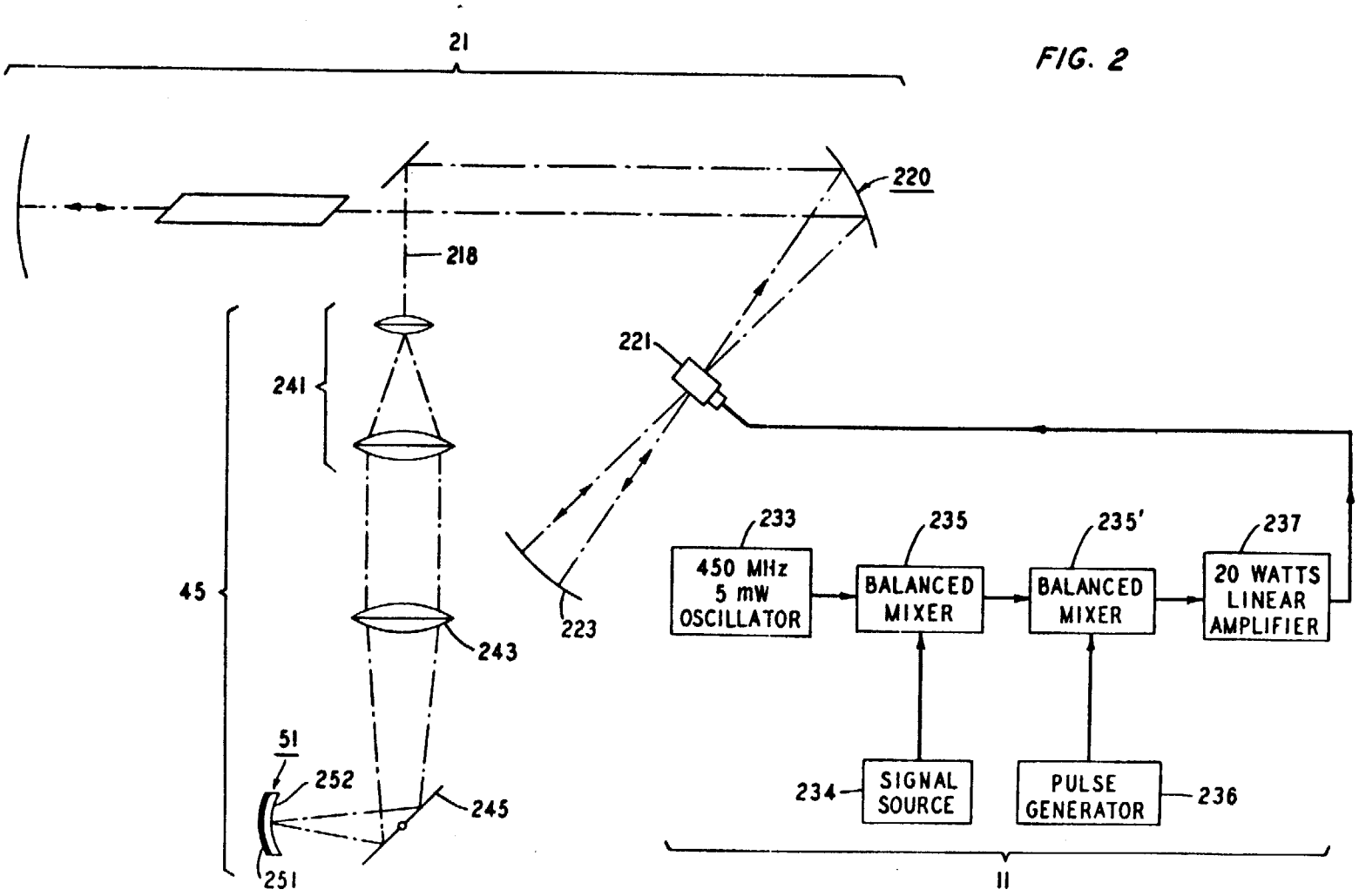
FIG. 2 depicts a first illustrative embodiment of a pulse forming means, a focusing and scanning means, and a recording medium of the apparatus of FIG. 1.

Source 21 of optical pulses is illustratively an intracavity modulator, such as that described in the concurrently filed application of D. Maydan entitled "Intracavity Modulator," Ser. No. 115,026, assigned to Bell Telephone Laboratories, Incorporated. As described therein, and as shown in FIG. 2, the intracavity modulator is comprised of a V-shaped, three-mirror laser cavity 220 in one arm of which is located an acousto-optic modulator 221. Radiation in cavity 220 converges to a waist near the center of curvature of end mirror 223; and modulator 221 is located at this center of curvature. Part of the optical power in this cavity is diffracted by acoustic waves propagating in the modulator to form a beam of radiation 218 that is extracted from the cavity. Because the diffracted optical power is proportional to the radio-frequency power in the signal applied to the modulator, amplitude-modulated pulses of coherent radiation are diffracted from the cavity when amplitude-modulated pulses of radio-frequency waves are applied to acousto-optic modulator 221.

Source 11 of amplitude-modulated pulses of radio-frequency waves is likewise described in detail in the concurrently filed patent application of D. Maydan. Source 11 comprises means for forming a pulse train of radio-frequency waves and means for amplifying the pulses. Illustratively, as shown in FIG. 2, these means comprise a local radio-frequency oscillator 233, a signal source 234, a first balanced mixer 235, a pulse generator 236, a second balanced mixer 235' and an amplifier 237. All this apparatus may be standard. A radio-frequency signal from oscillator 233 is amplitude modulated in mixer 235 by a signal from source 234; and the output of mixer 235 is gated in mixer 235' by pulses from generator 236. The resulting signal comprising a train of amplitude-modulated pulses that define the envelope of the radio-frequency signal is then amplified by amplifier 237 and applied to a transducer attached to acousto-optic modulator 221. Typically, oscillator 233 is operated at 450 MHz; and pulse generator 236 produces 0.5-volt pulses with a duration of about 25 nanoseconds and a repetition rate of 1 MHz. The pulse spacing as measured between the leading edges of successive pulses is therefore 1 microsecond. The range of pulse amplitudes is such that for at least one amplitude enough radiation is dumped from cavity 220 to produce a discernible effect on recording medium 51 and for another amplitude no effect is produced. As will be described below, halftone images may also be recorded provided the range of pulse amplitudes is such that there are at least two amplitudes for which different effects are produced by beam 218 on recording medium 51 and a third amplitude for which no readily discernible effect is produced. In both cases the amplitude for which no effect is produced may be zero.

Illustratively, source 234 provides a video signal formed in reading means 71 by scanning an object whose image is to be recorded on recording medium 51. Typical objects are a picture, an X-ray, a chart, a photograph, a page of writing, a page of a book, a microfilm image, a portion of a newspaper print and a three-dimensional object. By illuminating very small regions of the object in a time sequential fashion and detecting the relative intensity of the light returned from each region by scattering and reflection, it is possible to "read" the object and form a facsimile signal representative of it. In a particular embodiment of the invention, the illuminating means is a raster scanned laser beam; and the returned laser radiation is read or detected by photodetectors to generate a signal representative of the object being scanned. Depending on the application, this signal can be electrically processed so as to produce either a positive image or its negative. Further details of such reading means 71 are given below in conjunction with FIGS. 6 and 7. Alternatively, source 234 could be a computer that generates a graphic or alphanumeric display.

Because of the power diffracted from the laser cavity is proportional to the power in the pulses of radio-frequency waves applied to the acousto-optic modulator in the cavity, the optical pulses from source 21 have a power and an energy that is proportional to the amplitude of the signal applied to modulator 221. Moreover, because the amplitude of the signal applied to modulator 221 is proportional to the signal formed by scanning the object to be recorded, the amplitude-modulated pulses of coherent radiation from source 21 have a power and an energy that is proportional to the signal derived by scanning the object.

Figure 4:
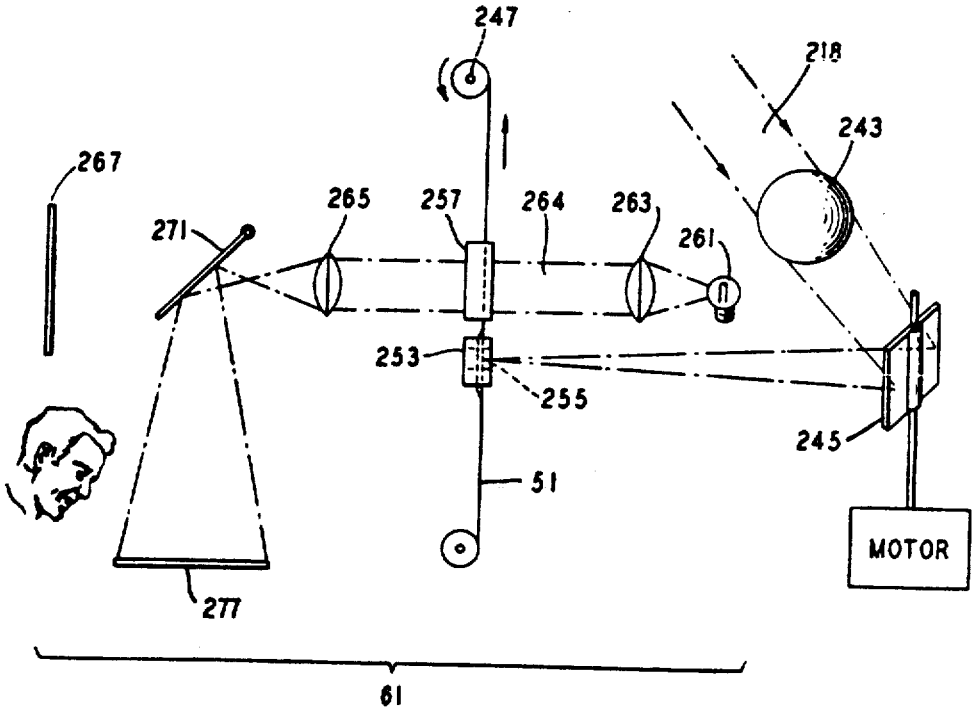
FIGS. 3 and 4 depict an illustrative embodiment of the focusing and scanning means, the recording medium and a display means of the apparatus of FIG. 3.
Figure 3:
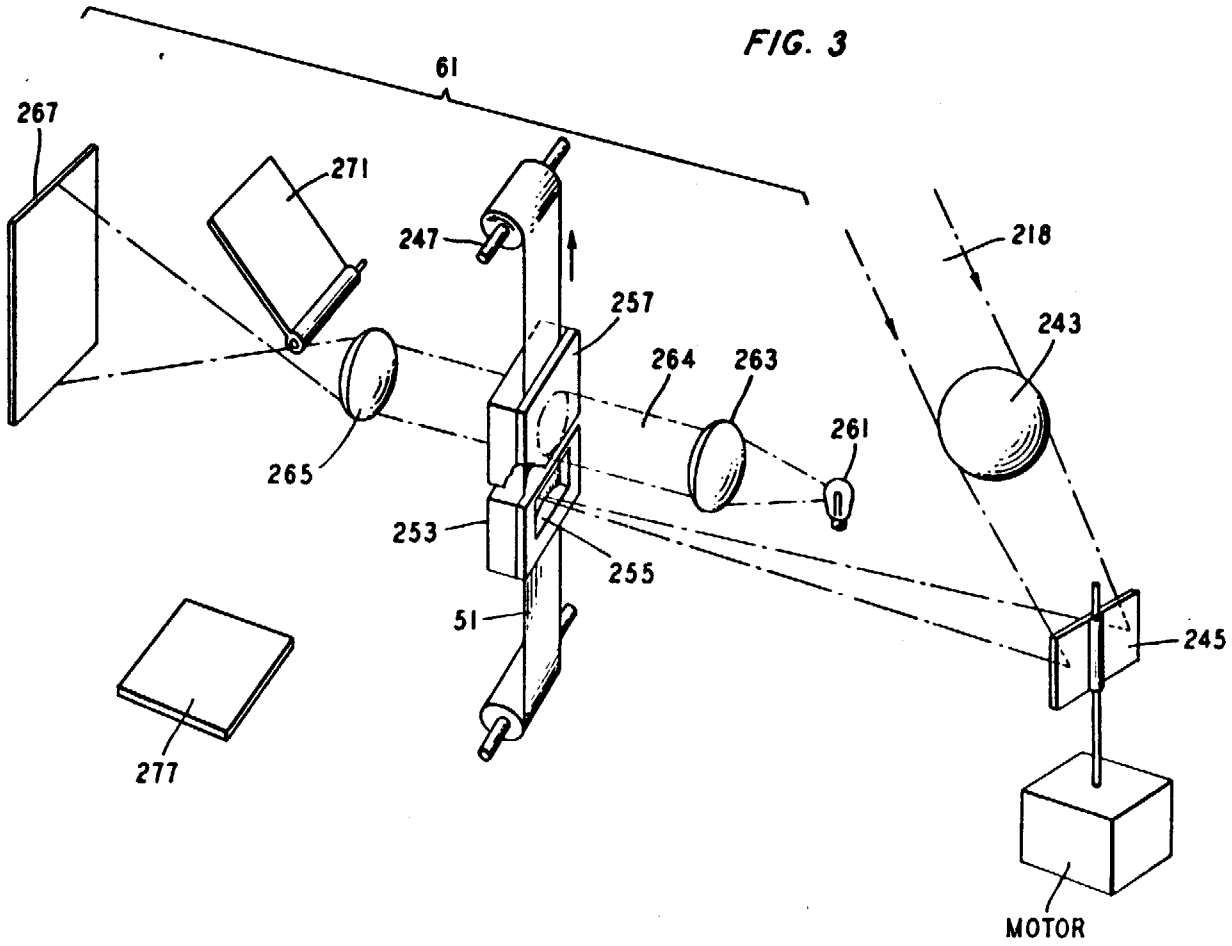

To write a pictorial image of the scanned object on recording medium 51, these amplitude-modulated pulses in beam 218 are focused and scanned by means 45 onto recording medium 51. As shown in FIGS. 2, 3 and 4, focusing and scanning means 45 comprises a beam expander 241, a focusing lens 243, a scanning galvanometer 245, and film transport means 247 (shown in FIGS. 3 and 4) for moving recording medium 51 in a direction transverse to the direction in which the pulses of coherent radiation are scanned by galvanometer 245.

This combination of scanning galvanometer 245 and film transport means 247 provides a two-dimensional scan of recording medium 51 in which each pulse in beam 218 is incident on a different portion of film 251. Specifically, the scanning speed of galvanometer 245 is such that in the interval between any two pulses galvanometer 245 rotates enough that each pulse is incident on sufficiently different portions of film 251 as to form discrete holes in the film. Thus, if the maximum diameter of a hole formed in film 251 is 5 microns and if the pulses have a duration of approximately 25 nanoseconds and a spacing of 1 microsecond, then, in the 975 nanosecond interval between pulses, galvanometer 245 rotates enough that the two pulses are incident on portions of film 251 that are spaced apart a distance greater than 5 microns as measured between the centers of said portions. Similarly, the speed of film transport means 247 is such that after a line of holes has been formed a new line of holes is formed that is discrete from the previous line. Thus, if the time elapsed from the starting of one line to the starting of the next is 2 milliseconds, film transport means 247 must advance recording medium 51 by at least 5 microns every 2 milliseconds.

Ordinarily, the intensity of radiation in beam 218 is radially symmetric and has a Gaussian profile. Focusing lens 243 concentrates beam 218 to a waist at the position of film 251. For experiments conducted with this invention using a gas laser that delivered an average power of 12 milliwatts to film 251, the diameter of the beam waist was on the order of 5 microns as measured between the points at which the intensity of the beam fell off to $(1/e)^2$ of the peak intensity. For this diameter, the depth of focus of the laser beam is large enough that overly stringent requirements are not imposed on the stability of the position of film 251. It is preferred that the laser deliver to the film an average power output of less than approximately 18 milliwatts in the Gaussian mode.

Recording medium 51 comprises a radiation absorbing film 251 on a transparent substrate. Preferably film 251 is made of bismuth about 200 to 1000 Angstrom (A) thick deposited on a substrate 252 that is a transparent polyester material, such as Mylar, about 100 microns thick. For clarity, the thicknesses of film 251 and substrate 252 have been greatly enlarged with respect to each other and the other elements in FIG. 2. The width of film 251 and substrate 252 is typically 16 millimeters. As shown in FIGS. 2, 3 and 4, recording medium 51 is slightly curved so that opaque film 251 lies in the focal surface of lens 243. While the precise location of this surface depends on any aberrations in lens 243, the approximate location of this surface is on the circumference of a circle having as its center the axis about which galvanometer 245 rotates. A block 253 of material is used to hold medium 51 so that film 251 lies in the focal surface of lens 243. As shown in FIG. 3, this block is divided into two parts that may be separated in order to thread the film between them. For clarity, clamps that hold together these two parts of block 253 have been omitted from FIG. 3.

Figure 5:
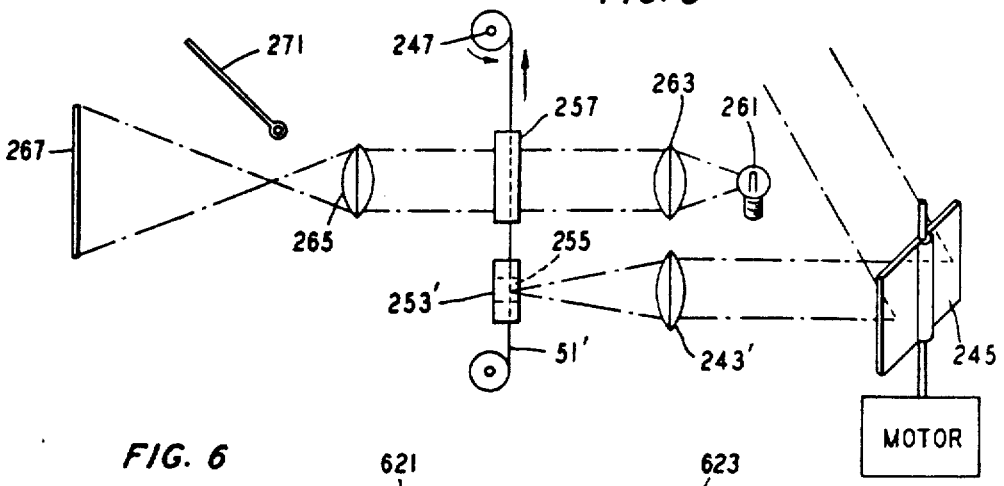
FIG. 5 depicts a second illustrative embodiment of the focusing and scanning means, the recording medium and the display means of the apparatus of FIG. 1, and FIGS. 6 and 7 depict illustrative embodiments of a reading means of the apparatus of FIG. 1.

Alternatively, as shown in FIG. 5, the focusing lens, represented in this figure as element 243', may be located between scanning galvanometer 245 and the recording medium, here represented as element 51'. With lens 243' in this position, its focal surface is substantially flat; and film 251 should therefore also be flat. To hold film 251 in the focal plane, recording medium 51' is fed through an appropriately positioned block 253' that is similar to block 253 of FIGS. 2, 3 and 4 except for the fact that it holds medium 51' in a plane.

As shown in FIGS. 3, 4 and 5 an opening 255 in blocks 253 and 253' permits beam 218 to be scanned onto recording media 51 and 51' without passing through the block. This opening also permits any material removed from film 251 to be exhausted from the image writing area. Preferably, recording medium 51 is oriented as shown in FIG. 2 so that beam 218 passes through transparent substrate 252 before it is incident on film 251. As a result, any material removed from film 251 is exhausted through opening 255 on the side away from galvanometer 245, thereby avoiding any fogging of elements 243 and 245 by the removed material. Of course, where fogging is not a problem, medium 51 can be oriented so that beam 218 is incident on film 251 without first traversing substrate 252.

To write an image of the scanned object on medium 51, a signal representative of the image is applied to modulator 221. This signal is transformed by modulator 221 into beam 218 of amplitude modulated pulses of coherent optical radiation. Beam 218 is then focused by lens 243 onto film 251 and scanned across it by the co-action of scanning galvanometer 245 and film transport means 247.

Each focused pulse of coherent radiation of non-zero energy heats up a very small discrete region of the film. The amount of temperature rise in a metal film has been analyzed by solving the differential equations of heat conduction and has been found to depend on the duration of the laser pulse and the energy in the pulse. To minimize heat loss to the substrate, the pulse duration should be as short as possible. Durations of 25 to 30 nanoseconds have proven quite satisfactory in writing images in bismuth films. Throughout the thickness of the film in the region on which the laser pulse is incident, the temperature rise per unit of incident power varies only slightly The temperature rise in a unit area of the film is dependent on the energy incident on that area of the film. The temperature in the film increases monotonically with increasing energy density in the pulse up to the melting point of the film. A certain amount of heat energy is expended in melting the film; but after melting has taken place, the temperature in the melted film once again increases monotonically. This increase, of course, ends when the boiling point of the film is reached.

If the temperature in any part of the region on which the laser pulse is incident reaches the boiling point of the film or if a sufficiently large area is melted, a hole or crater is formed in the film. Surface tension in this melted region then increases the size of the hole that is formed by drawing back a substantial portion of the melted region. As a result, a crater-like hole is formed having a raised rim that is made up of the material that was first melted and then drawn to the rim by surface tension where it solidified.

The size of the hole that is formed increases monotonically with increasing energy density in the laser pulse. Consequently, when the energy in each laser pulse has one of at least three magnitudes, two of which are sufficiently different to produce different effects on the recording medium, the series of amplitude-modulated pulses in beam 218 forms an image comprised of an array of holes of varying size in radiation absorbing film 251. This image has a gray scale that is quite good when the laser pulses have a sufficient range of energies to produce holes having diameters that vary by a factor of approximately 2.5 or more. In experiments conducted with bismuth films of thicknesses up to several thousand Angstroms deposited on polyester substrates, the area of holes formed in the film was observed to vary linearly with the energy density incident on the film.

In practicing the invention with an argon ion laser that was operated to produce an average power of up to 25 milliwatts, approximately 70 percent of the average power was incident on film 251. The maximum diameter of a focused spot on film 251 was approximately 5 microns as measured between the $(1/e)^2$ points of the Gaussian profile of the intensity of a spot. For a pulse duration of approximately 25 nanoseconds and a pulse spacing of approximately 1 microsecond, the peak power incident on film 251 ranged from approximately 0.2 watts to 0.7 watts, where peak power is the average power times the time interval from the start of one pulse to the start of the next divided by the pulse duration. For such a range of powers, the area of a hole formed in a 500 A. thick bismuth film deposited on a Mylar substrate was observed to vary linearly for holes having diameters from less than 1 micron to approximately 6 microns. One image that was recorded with excellent gray scale was that of an 8½ x 11 inches IEEE Facsimile Test Chart. This image was recorded on an approximately 10 x 13 millimeter portion of film 251, representing a reduction ratio of about 22 to 1. The total number of spots that were formed in each line on the recording medium was approximately 1400 and approximately 2000 such lines were made. As a result, the density of holes was approximately $2.2\times10^6$ per centimeter$^2$. For such density, the resolution of the image when viewed at a normal 8½ x 11 inch size was about 175 lines per inch. With a pulse repetition rate of 1 MHz. it took approximately 4 seconds to write this image of $2.2\times10^6$ spots because there was about 30 percent dead time in the apparatus used.

In other experiments with the invention, a helium-neon laser was used that had a discharge length less than 60 centimeters and a 3 millimeter bore diameter. This laser had an average power output of 14 milliwatts of which approximately 12 milliwatts were incident on film 251. The diameter of the holes that were formed in the film ranged from less than 1 micron to approximately 5 microns; and the image of the Facsimile Test Chart measured approximately 7 x 9 millimeters, representing a reduction ratio of about 30 to 1. The duration of each pulse was 30 nanoseconds, and the spacing between pulses was approximately 1 microsecond. The thickness of the film, the number of holes formed, and the time it took to form the image were the same as those in the experiments conducted with the argon laser.

For bismuth films that were approximately 500 A. thick, the energy density required to form a hole having a diameter of approximately 5 microns was on the order of 0.06 joule per centimeter.$^2$ This energy density is available from a good focusing lens whenever the average power delivered to the film is approximately 12 milliwatts. For film thicknesses ranging from 200 to 1000 A., the energy density required to initiate machining of the film is a slowly increasing function of film thickness. Only about 20 percent more energy is needed to initiate machining of a 800 A. thick film than is required for a 400 A. thick film.

The amount of material that is removed from the bismuth film by machining was studied by writing in the film an all white image, namely, an image comprised of a discrete hole of maximum size at every location in the image where a hole could be made. From this experiment it was determined that after machining only 10 percent of the area of the image remained covered by bismuth. However, the amount of material that was removed from the bismuth film as determined from X-ray fluorescence studies was less than 40 percent. Only a portion of this removed bismuth was in the vapor phase. The remainder was in the form of droplets of liquid metal. The remaining material that was withdrawn from the region where the holes were formed but not removed from the bismuth film apparently formed the rims of the crater-like holes or was deposited as nearly spherical particles just beyond the rims.

The images that is recorded on medium 51 can be viewed with display means 61 shown in FIGS. 3 and 4. Display means 61 comprises a light source 261 and a condenser lens 263 that form a beam of light 264 that is incident on recording medium 51, means 257 for holding medium 51 flat, an imaging lens 265, a back projection screen 267, a mirror 271, and a front projection screen 277. Lens 265 is positioned to magnify the image to a size suitable for viewing. When the distance from recording medium 51 to screen 277 is appreciably different from the distance from medium 51 to screen 267, lens 265 must be located at different positions in order to achieve sharpest imaging; or it must be possible to alter the focal length of the lens. Means for moving the lens or altering its focal length are conventional and accordingly have not been shown in FIG. 4. The corresponding apparatus shown in FIG. 5 is similar.

To project an image onto screen 267, mirror 271 is positioned as shown in FIG. 3; and light is directed from source 261 through condenser lens 263 onto recording medium 51. Imaging lens 265 then forms on screen 267 an image of what is illuminated on recording medium 51. A viewer situated on the other side of the back projection screen, as shown in FIG. 3, can then observe this image simply by looking at the screen.

Alternatively, the image can be projected onto front projection screen 277 as shown in FIG. 4. In this case, reflector 271 is rotated so that it lies in the path of the light imaged by lens 265 and directs light from this lens onto screen 277. Recording medium 51 is then illuminated by light beam 264, and lens 265 forms on screen 277 an image of what is illuminated on medium 51. A viewer situated on the same side of front projection screen 277 as shown in FIG. 4 can then observe this image by looking at the screen.

Alternatively, a permanent, full-size copy of the image projected toward screen 277 can be made by locating a suitable recording medium on the front surface of screen 277. Such a recording medium could be a conventional photographic plate. It might also be a recording material such as Electrofax paper or a dry silver paper. Still another way to produce a permanent, full-size copy would be to replace the front projection screen 277 with the recording drum of any of the office copier machines, such as the Xerox copier.

Figure 6:
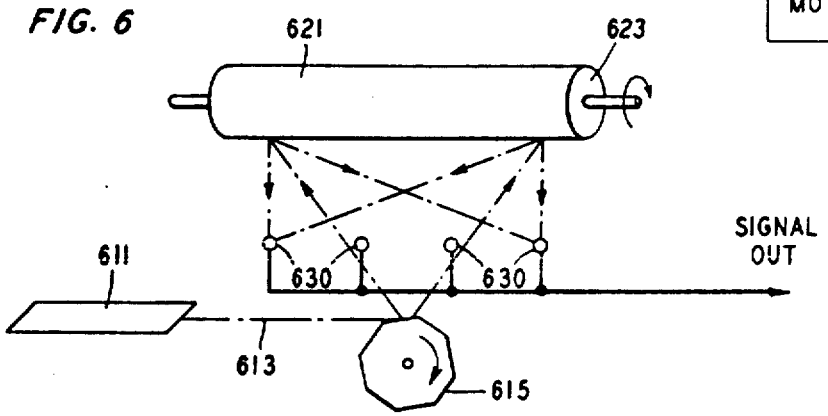
Figure 7:
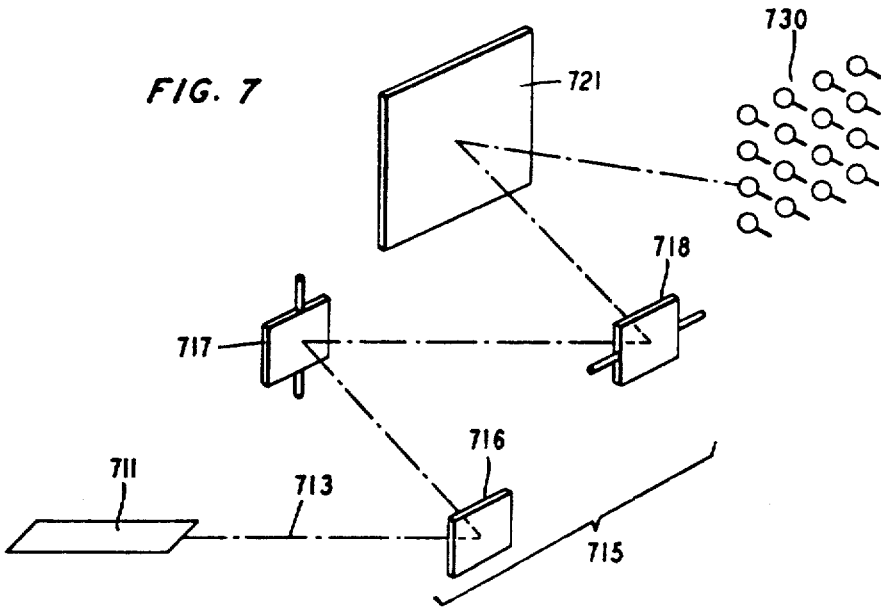

Alternative reading means for producing a video signal for signal source 234 are shown in FIGS. 6 and 7. The apparatus in FIG. 6 comprises a laser 611, a scanning mirror 615, a drum 623 on which is mounted an object 621 that is to be scanned, and an array of photodetectors 630. Scanning mirror 615 is a multifaceted mirror that is rotated at high speeds to scan an incident light beam across the object.

To scan object 621, a beam of radiation 613 from laser 611 is directed toward scanning mirror 615. There it is deflected by one of the facets of mirror 615 so that is scans across object 621. Portions of this scanned beam are scattered by object 621 to photodetectors 630. A signal from each of these photodetectors is then summed to give a signal representing the amount of light scattered from that point on the object at which the laser beam is incident. As beam 613 is scanned over one line, a signal is produced representative of the scattered light generated by the incident beam. By the time the scan of one line is completed, drum 623 has rotated a small amount; and rotating mirror 615 has advanced enough that laser beam 613 is incident on another facet of mirror 615. Consequently, a new scan is commenced and a new signal is produced indicative of the scattering along a second line on the object.

Alternatively, with the apparatus of FIG. 7, a stationary object may be scanned in two dimensions. This apparatus comprises a laser 711, an X–Y scanning galvanometer 715, an object 721 to be scanned and an array of photodetectors 730. X–Y scanning galvanometer 715 is comprised of a stationary mirror 716, whose use is optional, a high-speed scanning mirror 717 and a low-speed scanning mirror 718 oriented to scan in a direction orthogonal to the direction in which mirror 717 scans. Such a galvanometer is manufactured by General Scannings, Incorporated of Watertown, Mass., as Model No. XY125.

To form a signal representative of the scattering by object 721, a beam of radiation 713 from laser 711 is directed onto fixed mirror 716 of galvanometer 715. This beam is then reflected by mirrors 717 and 718 onto object 721. Radiation reflected from this object is detected by detectors 730 and summed to form a signal representative of the scattering by object 721 at the point on the object at which laser beam 713 is incident. As high-speed scanning mirror 717 rotates, beam 713 is scanned across a horizontal line on object 721: and the radiation scattered from object 721 is summed by detector 730 to form signals representative of the scattering of the object along this line. After one line is completed, scanning mirror 717 is returned to its initial position and mirror 718 is at a sufficiently different position that a new line on object 721 can be scanned. In this way, object 721 is scanned in raster fashion by beam 713 and a signal representative of the scattered light is formed.

There are numerous applications to which this invention may be put. For example, it could be used to furnish hard copy for information transmitted over telephone and PICTUREPHONE networks. When used for such two-way communication, the functions of scanning an object and of reproducing an object can readily be combined into one station set. In this case, one laser may be used to form the pulses that write an image of an object transmitted from another station; and a second laser may be used to scan an object that is to be transmitted to the other station. Alternatively, a single laser can be used both to scan the object to be transmitted and to write an image of an object by using an appropriate means to direct the laser beam either to the apparatus for scanning the object or the apparatus for recording an image of the object on medium 51.

Some other applications of the invention are for graphic or alphanumeric display at a computer terminal and for recording or displaying television pictures. For computer output the formation of the pulses of coherent radiation is merely controlled by the computer and the remaining apparatus is the same as described above. For television recording and displaying, the video signal is used to form images on a recording medium. While this application requires the recording of many frames per second, sufficient energy density can be provided for this by recording smaller images or using more powerful lasers than those used in the applications described above. For display of what is recorded, images on the recording medium can either be magnified to fill a viewing screen or they can be scanned to produce a video signal that is used to form a picture on a television screen.

As will be obvious to those skilled in the art, numerous modifications can be made in the apparatus of this invention and the application to which it is put. As discussed in the above-mentioned, concurrently-filed application of D. Maydan, numerous laser media have been used in conjunction with the acousto-optic modulator. Such lasers include the helium-neon, argon, and helium-cadmium gas lasers, dye lasers as well as the Nd:YAlG rod. All of these lasers could be used in this application as well. In addition, a Q-switched Nd:YAlG laser could be used in this invention where only low pulse repetition rates are required. Because the average power required to form holes in the recording medium is quite low, many other lasers can also be used at repetition rates that previously were not feasible. Of the newer lasers, electronically-pulsed gallium arsenide lasers are particularly attractive for use with the invention.

The particular means used for modulating the laser is preferably the V-shaped, three mirror acousto-optic intracavity modulator described in detail in the above mentioned application of D. Maydan. As explained therein, this modulator can be operated both in a Q-switching mode at low frequencies and in a cavity dumping mode at pulse repetition rates in excess of 125 kHz. By using this modulator it has been possible to form images with laser energies that are considerably less than energies previously reported in the literature. Of course, as other efficient laser modulators are developed, it may be possible to substitute those modulators for the acousto-optic modulator. While amplitude modulation of the laser pulses is the method that has been used to form holes of varying size in the recording medium, this variation in size could also be achieved by varying the duration of the pulse because the size of the hole depends on the total energy in the pulse.

The focusing and scanning means that were described in conjunction with the invention are only illustrative. Numerous other means will be apparent to those skilled in the art. One of the most promising such means is the use of acousto-optic deflectors to achieve an X–Y scan of the recording medium. Other means for achieving the scan could be a mirrored galvanometer combined with a deflector that is moved to achieve a scan in a second dimension. Still another approach to image scanning involves the use of a linear silicon imaging device consisting of a linear array of light sensitive elements that are sequentially read out to scan one line of the object and a moving mirror or other mechanical means to displace the line that is scanned over the surface of the object. For low resolution scanning, a vidicon or silicon camera tube could also be used.

In some applications of the invention, particularly efficient operation may be achieved by focusing the beam so that the diameter $2r_o$ of the focused beam at film 251, as measured between the points at which the intensity of the beam falls off to $(1/e)^2$ of the peak intensity, is equal to $\sqrt{2}$ D where D is the diameter of the hole machined in film 251. This relation may be derived by noting that the total power P in a laser beam is given by the relation $$P=(\pi/2)Ir_o^2e^{2(r/r_o)^2}$$

where I is the intensity of the beam at distance r from its center and $r_o$ is as defined above. In general, a threshold intensity is required in laser machining to produce a desired effect at a given distance from the center of the machining beam. Thus, the power P required to produce a hole of radius D/2 is given by $P=(\pi/2)I_tr_o^2e^{2(D/2/r_o)^2}$ where $I_t$ is the intensity of the beam at the edge of the hole that is formed. By differentiating P with respect to $r_o$ and setting the derivative equal to zero, the relation $2r_o=\sqrt{2}$ D is obtained. From this relation, it can be shown that the peak intensity of the beam is equal to $eI_t$.

Accordingly, with a Gaussian beam a film can be machined most efficiently by ascertaining the minimum laser power $P_{min}$ needed to produce the desired effect in the smallest observable portion of the film being machined. Total laser power is directly proportional to intensity. Hence, the most efficient laser machining will take place when the laser power is equal to $e \cdot P_{min}$. At this most efficient operating power, the diameter of the hole that is formed in the machined film is $\sqrt{2}r_o$.

In experimental work, the attainment of optimum machining efficiency is complicated because the width of the hole machined in a film can be dependent on other factors than the intensity of the incident beam. For example, in bismuth the size of the hole that is formed is due in part to effects of surface tension in melted portions of the bismuth. However, by taking into effect these factors as well, the optimum beam width can be determined for machining a hole of a particular diameter.

As has been indicated above, bismuth is preferred for use as the recording medium. This metal is desired because it is highly absorptive to laser radiation from at least 3800 to 10,000 A. and in addition has a relatively low melting point at 271° C. However, numerous other metals, their alloys, or other radiation absorbing films could be used including indium, tin, cadmium, aluminum, lead, zinc and antimony. The substrate, of course, should be transparent and a poor heat conductor. For these requirements, the various types of polyester have proven useful. Glass may also be used but it is not as flexible as polyester and conducts heat more readily.

The display means described above is likewise only one of many that can be used. Real time display can be provided by directing light through the recording medium at the same time as the laser beam is forming holes on the recording medium. As an alternative to transmitting light through the recording medium, the image can be formed by reflecting light off the recording medium. Especially high reflectivity can be obtained if a layer of aluminum is located on the outer surface of the bismuth. If the image that is recorded on the recording medium is a positive, the image viewed by reflection will be a negative. Alternatively, it is possible to form a negative image on the recording medium simply by inverting the video signal used in forming the signal applied to the intracavity modulator. Means for performing such inversion will bo obvious to those skilled in the art.

By scanning and transmitting stereo pairs it is possible to form on the recording medium a stereo pair of images from which can be reconstructed a three-dimensional view of the object. Similarly, by scanning, transmitting, and combining on a common screen three images, each containing information about one of the primary colors in an object, it is possible to form three images that when viewed will reconstruct a color image of the object. Techniques for performing such scanning and illumination will be obvious to those skilled in the art.

As will be obvious to those skilled in the art still other modifications may be made in the above-described apparatus without departing from the spirit and scope of the invention.

What is claimed is:

1. A communication system comprising:

first and second station sets and means for transmitting signals between said station sets;

said first station set comprising:

means for raster scanning a first object with a beam of radiation and forming a first signal representative of the radiation scattered from said object; and means for forming pulses of coherent radiation, each of said pulses having one of at least three energies in accordance with an applied signal, at least one of which energies is below the threshold energy required in said apparatus to form holes in a radiation absorbing film and at least two of which are above said threshold and sufficiently different to form holes of different sizes;

means for causing said pulses to be incident on different parts of the film; and focusing means for concentrating the energy enough to remove a portion of the radiation absorbing film;

said second station set comprising:

means for raster scanning a second object with a beam of radiation and forming a second signal representative of the radiation scattered from said object;

means for forming pulses of coherent radiation, each of said pulses having one of at least three energies in accordance with an applied signal, at least one of which is below the threshold energy required in said apparatus to form holes in a radiation absorbing film and at least two of which are above said threshold and sufficiently different to form holes of different sizes;

means for causing said pulses to be incident on different parts of the film; and focusing means for concentrating the energy enough to remove a portion of the radiation absorbing film; and said transmitting means transmitting the first signal formed by raster scanning the first object to the second station set where it is applied to the means for forming pulses of coherent radiation and the second signal formed by raster scanning the second object to the first station set where it is applied to the means for forming pulses of coherent radiation.

2. Apparatus for forming in a radiation absorbing film on a transparent substrate a pictorial image frame comprising a multitude of small discrete holes, said apparatus comprising:

a source of modulated coherent radiation for forming pulses of coherent radiation, each of said pulses having one of at least three energies, at least one of which is below the threshold energy required in said apparatus to form holes in said film and at least two of which are above said threshold and sufficiently different to form holes of different sizes;

said source of coherent radiation is comprised of a laser medium from which can be formed a beam of electromagnetic radiation and a cavity comprising at least first and second reflectors enclosing said medium, said cavity having a geometry such that the beam of radiation has a waist in a region near the center of curvature of the second reflector;

a modulator located at approximately the center of curvature of the second reflector, said modulator being adapted to form a first diffracted beam upon the passage of said beam of electromagnetic radiation through the modulater in one direction and a second diffracted beam upon the passage of said beam of electromagnetic radiation through the modulator in the opposite direction;

means for causing said pulses to be incident on different parts of the film; and focusing means for concentrating the energy in the pulses having more than the threshold energy so as to remove a portion of the radiation absorbing film.

3. The apparatus of claim 2 wherein:

the cavity further comprises a third element that is either a lens or a reflector and is located in the optical path between said first and second reflectors;

the second reflector and the third elements are spaced apart a distance greater than the radius of curvature of the second reflectors;

the laser medium is located between the first reflector and the third element; and the modulator is an acousto-optic modulator.

4. The apparatus of claim 2 further comprises means for deflecting light within the acousto-optic modulator comprising:

an acousto-optic medium, a transducer, a local oscillator, a signal source, a first balanced mixer that modulates the output of the local oscillator with the output of the signal source, a pulse generator, and a second balanced mixer that modulates the output of the first balanced mixer with the output of the pulsed generator.

5. The apparatus of claim 4 further comprising means for inverting the output of the signal source.

6. Apparatus for forming in a radiation absorbing film on a transparent substrate a pictorial image frame comprising a multitude of small discrete holes, and displaying the image frame, said apparatus comprising:

a source of modulated coherent radiation for forming pulses of coherent radiation;

means for causing said pulses to scan the film in [rastor-like] *raster-like* fashion to form an aggregate of holes in the film, the aggregate of holes forming an image frame, each hole being separated by more than the diameter of the largest hole formed in said film, as measured from the centers of adjacent holes;

means for varying the energy of each pulse in that range of time for which the area of the hole formed by the pulse increases with increasing energy whereby a gray scale is provided; and means for projecting light through the entire frame to view the image.

7. The apparatus of claim 6 further comprising:

a viewing screen; and imaging means for forming on the screens an image of the light that is directed through the holes.

8. The apparatus of claim 6 further comprising:
means for reflecting light off the portions of the film in which the holes are formed;
a viewing screen; and
imaging means for forming on the screen an image of the light that is reflected by the film.

9. The apparatus of claim 6 further comprising means for varying the energy in a pulse by varying the duration of the pulse.

10. The apparatus of claim 6 further comprising means for varying the energy in a pulse by varying the amplitude of the pulse.

11. The apparatus of claim 6 wherein the source of modulated coherent radiation is an electronically pulsed GaAs laser and means for modulating its output.

12. The apparatus of claim 6 wherein the source of modulated coherent radiation is any Q-switched laser and means for modulating the total energy of individual pulses produced by said laser.

13. The apparatus of claim 6 wherein the source of modulated coherent radiation is an optically pumped dye laser and means for modulating its output.

14. The apparatus of claim 6 wherein the source of modulated coherent radiation is a laser that delivers to the film an average power output of less than approximately 18 milliwatts in the Gaussian mode and means for modulating the laser output.

15. The apparatus of claim 6 wherein the means for causing the pulses to scan dicerent parts of the film comprises:
a beam deflector for deflecting the pulses of coherent radiation in a first direction acros the surface of the film; and
film transport means for moving said film in a direction perpendicular to said first direction.

16. The apparatus of claim 6 further comprising mounting means adapted to hold said film and substrate so that during the formation of holes in the film the substrate is closer to the source of coherent radiation than the film.

17. The apparatus of claim 6 wherein the film is chosen from the group consisting of bismuth, indium, tin, cadmium, aluminum, lead, zinc, antimony and alloys of two or more of these elements and the substrate is polyester.

18. The apparatus of claim 6 further comprising means for viewing stereo pairs of images produced on the recording medium.

19. The apparatus of claim 6 further comprising means for combining into one color image three images recorded on the recording medium, each image being an image of a different primary color of an object.

20. The apparatus of claim 6 wherein the focusing means focuses pulses having a Gaussian profile and one of the energies above threshold to a diameter approximately equal to $\sqrt{2}$ D where D is the diameter of the hole that is formed and the diameter of the pulse is measured between the points at which the intensity of the pulse drops off to $(i/e)^2$ of the maximum intensity.

21. A method for forming in a radiation absorbing film on a transparent substrate a multitude of small discrete holes that comprise a pictorial image and displaying said image, said method comprising:
forming pulses of coherent radiation, each of said pulses having one of at least two energies, at least one of which is below the threshold energy required in said method to form holes in said film and at least one of which is above said threhold;
causing said pulses to scan the film in [rastor-like] *raster like* fashion to form an aggregate of holes in the film, the aggregate of holes forming an image frame, each hole being separated by more than the diameter of the largest hole formed in said film as measured between the centers of adjacent holes;
varying the energy of each pulse in that range of time for which the area of the hole formed by the pulse increases with increasing energy whereby a gray scale is provided; and
projecting light through the entire frame to view the image.

22. The method of claim 21 wherein:
each pulse of coherent radiation has one of at least three energies, at least one of which is below the threshold energy required in said method to form holes in said film and at least two of which are above said threshold and sufficiently different to form holes of different sizes; and
the pulses are incident on different parts of the film separated by more than the maximum diameter of a hole formed in said film as measured between the centers of said different parts.

23. The method of claim 21 wherein the duration of each pulse is on the order of 30 nanoseconds.

24. The method of claim 21 wherein the spacing between pulses is less than 8 microseconds.

25. The method of claim 21 wherein the film is a bismuth film approximately 500 A. thick and the energy density in the pulses as measured at incidence on the film is approximately 0.06 joule per centimeter.[2]

*26. Apparatus for forming in a radiation absorbing film on a transparent substrate a pictorial image frame comprising a multitude of small discrete holes, and displaying the image frame, said apparatus comprising:*
*a source of modulated coherent radiation for forming pulses of coherent radiation;*
*means for causing said pulses to scan the film in raster-like fashion to form an aggregate of holes in the film, the aggregate of holes forming an image frame, the holes being separated by approximately the diameter of the largest hole formed in said film as measured from the centers of adjacent holes;*
*means for varying the energy of each pulse in that range for which the area of the hole formed by the pulse increases with increasing energy whereby a gray scale is provided; and*
*means for projecting light through the entire frame to view the image.*

*27. A method for forming in a radiation absorbing film on a transparent substrate a multitude of small discrete holes that comprise a pictorial image and displaying said method comprising:*
*forming pulses of coherent radiation, each of said pulses having one of at least two energies, at least one of which is below the threshold energy required in said method to form holes in said film and at least one of which is above said threshold;*
*causing said pulses to scan the film in raster-like fashion to form an aggregate of holes in the film, the aggregate of holes forming an image frame, the holes being separated by approximately the diameter of the largest hole formed in said film as measured between the centers of adjacent holes;*
*varying the energy of each pulse in that range for which the area of the hole formed by the pulse increases with increasing energy whereby a gray scale is provided; and*
*projecting light through the entire frame to view the image.*

References Cited

The following references, cited by the Examiner, are of record in the patented file of this patent or the original patent.

UNITED STATES PATENTS

| | | | |
|---|---|---|---|
| 3,455,239 | 7/1969 | Smith | 178—6.6 B |
| 3,362,017 | 1/1968 | Brahm | 178—6.6 B |
| 3,462,762 | 8/1969 | Kaspaul | 346—74 EB |
| 3,308,234 | 3/1967 | Bean | 178—6.6 TP |

(Other references on following page)

UNITED STATES PATENTS

| | | | |
|---|---|---|---|
| 3,406,354 | 10/1968 | Dumanchin | 331—94.5 |
| 3,449,577 | 6/1969 | Kogelnik | 250—199 |
| 3,423,588 | 1/1969 | Uchida | 250—199 |

FOREIGN PATENTS

| | | | |
|---|---|---|---|
| 1,263,091 | 3/1968 | Germany | 346—76 L |

HOWARD W. BRITTON, Primary Examiner

U.S. Cl. X.R.

178—6.6 TP; 346—76 L